United States Patent
Barnley et al.

(10) Patent No.: US 6,755,746 B2
(45) Date of Patent: Jun. 29, 2004

(54) SYSTEM FOR ROTATIONALLY COUPLING TWO TELESCOPIC SHAFTS

(75) Inventors: Peter Barnley, Gwent (GB); Paul Richards, Gwent Wales (GB); Christophe Lacaille, Worcs (GB)

(73) Assignee: Nacam France SA, Vendome (FR)

( * ) Notice: Subject to any disclaimer, the term of this patent is extended or adjusted under 35 U.S.C. 154(b) by 0 days.

(21) Appl. No.: 10/254,925

(22) Filed: Sep. 26, 2002

(65) Prior Publication Data

US 2003/0073502 A1 Apr. 17, 2003

(30) Foreign Application Priority Data

Oct. 15, 2001 (FR) ............................................ 01 13297

(51) Int. Cl.[7] .................................................. F16D 3/06
(52) U.S. Cl. ...................... 464/162; 403/359.5; 74/492
(58) Field of Search ........................... 464/30, 34, 77, 464/78, 160, 162; 403/359.3, 359.5, 371, 372; 74/492

(56) References Cited

U.S. PATENT DOCUMENTS

| | | | | |
|---|---|---|---|---|
| 2,116,290 A | * | 5/1938 | Spicer | 464/162 |
| 3,016,722 A | * | 1/1962 | Batdorf | 464/162 |
| 4,136,982 A | * | 1/1979 | Sagady | 403/359.5 X |
| 4,142,807 A | * | 3/1979 | Fisher et al. | 403/359.5 X |
| 4,222,246 A | | 9/1980 | Rongley | |
| 4,795,403 A | * | 1/1989 | Heine et al. | 464/77 |
| 4,828,423 A | | 5/1989 | Cramer, Jr. et al. | |
| 4,873,882 A | * | 10/1989 | Goscenski, Jr. | 464/160 X |
| 5,226,853 A | * | 7/1993 | Courgeon | 464/160 |
| 5,245,890 A | * | 9/1993 | Honlinger et al. | 464/162 X |
| 5,496,216 A | * | 3/1996 | Rohrle et al. | 464/160 X |
| 5,916,026 A | * | 6/1999 | Sadakata | 464/160 X |

FOREIGN PATENT DOCUMENTS

EP          0 814 012 A1    12/1997

* cited by examiner

*Primary Examiner*—Greg Binda
(74) *Attorney, Agent, or Firm*—Lawrence E. Laubscher, Sr.

(57) ABSTRACT

A system for rotationally coupling telescopic interior and exterior shafts, which are disposed so that they can slide one within the other along a common axis, includes a first rotational coupling between the two shafts which is constituted by a rotation friction system. A second rotational coupling between the two shafts is constituted by internal and external splines. The internal splines are on the periphery of the end of the interior shaft and the external splines are on the internal face of the exterior tubular shaft so that a normal rotation torque is transmitted by friction and an exceptional rotation torque is additionally transmitted by the splines.

5 Claims, 3 Drawing Sheets

SYSTEM FOR ROTATIONALLY COUPLING TWO TELESCOPIC SHAFTS

BACKGROUND OF THE INVENTION

1—Field of the Invention

The invention relates to a system for rotationally coupling two telescopic shafts along their common axis. A coupling system in accordance with the invention can in particular be applied to an automobile vehicle steering column, adopting it for an intermediate column part connected to a steering box or for an upper column part connected to a steering wheel.

2—Description of the Prior Art

In the more particular case of the intermediate shaft, the latter has a universal joint at each end: one universal joint is connected to a motion input of the steering box and the other universal joint is connected to the column top portion. To steer present-day automobile vehicles correctly, it is necessary for the length of the intermediate shaft to be variable and to adapt to oscillations of the front wheels of the vehicle, which oscillations are caused by the profile and state of the road surface.

Thus the intermediate shaft must first of all have a variable length, i.e. it must have a function of sliding of two shafts relative to each other along their common axis, which is the axis of the intermediate part. It must also have a function of transmission between the two shafts of rotation motion and the rotation torque necessary for operating the steering.

There are many sliding shaft coupling systems which transmit rotation torque between the two shafts by means of splines which have conjugate profiles respectively on the two shafts.

However, it is difficult to make this type of system with on the one hand a sufficient angular stiffness and on the other hand a sufficiently accurate axial displacement force in the event of an impact.

OBJECT OF THE INVENTION

The object of the present invention is to propose a telescopic shaft coupling system that avoids the foregoing drawbacks, i.e. a system which in normal operation functions with no clearance and which can transmit the very high rotation torque in exceptional operation. The system for coupling the two shafts must also be easy to install in the available spaces of existing automobile vehicles.

SUMMARY OF THE INVENTION

The invention concerns a system for rotationally coupling two shafts able to turn about a common axis. One of the two shafts is an interior shaft and the other shaft is an exterior shaft, the two shafts being disposed so that they can slide one within the other along said common axis. According to the invention, the coupling system comprises:

a first rotational coupling between the two shafts and which is constituted by a rotation friction system between the interior shaft and the exterior shaft; and
 a second rotational coupling between the two shafts and which is constituted by internal splines and external splines, the internal splines extending on the periphery of the end of the interior shaft and the external splines extending on the internal face of a tube constituting the exterior shaft, the internal splines and the external splines being adapted to cooperate with each other so that if a normal rotation torque is to be transmitted it is transmitted by friction and if an exceptional rotation torque is to be transmitted it is additionally transmitted by the splines after taking up clearance between the splines.

In one particularly advantageous embodiment of the invention, the first rotational coupling between the interior shaft and the exterior shaft includes a spring ring which constitutes the rotation friction system, and said spring ring on the one hand is pressed onto an internal face of a housing in the exterior shaft and on the other hand is pressed onto a smooth or knurled portion of an external face of the interior shaft.

In the above embodiment, the following highly beneficial architecture of the spring ring is used. Said spring ring is a metal ring which has a slit over the whole of its axial length. Said metal ring has over the whole of its circular length internal axial recesses and external axial recesses. The recesses alternate so that an external axial recess follows on from an internal axial recess. The external axial recesses are pressed onto the internal face of the housing in the exterior shaft, and the internal axial recesses are pressed onto the smooth or knurled portion of the external face of the interior shaft.

Furthermore, the coupling system according to the invention can include an axial coupling between the interior shaft and the exterior shaft.

In this case, the axial coupling between the interior shaft and the exterior shaft is effected by the rotation friction system, which is adapted to resist axial sliding between the interior shaft and the exterior shaft up to a predetermined value.

To further improve the performance of the coupling system according to the invention, said system includes a one-way axial abutment system to prevent extraction of the interior shaft in the direction of the common axis. Said axial abutment system includes a toroidal ring which is disposed in a housing located at an end of the exterior shaft and which is retained in the direction of the common axis by a crimping folding at said end of the exterior shaft on the toroidal ring, and said toroidal ring is pressed onto the smooth portion of the external face of the interior shaft.

The coupling system according to the invention applied to an intermediate portion of an automobile vehicle steering column or to a top portion of an automobile vehicle steering column.

The system for rotationally coupling two telescopic shafts thus has the advantage that it transmits rotation torque with no clearance under normal operating conditions and guarantees transmission of rotation torque under exceptional operating conditions. Finally, the coupling system can easily be installed in the space available for steering columns in existing automobile vehicles.

BRIEF DESCRIPTION OF THE DRAWINGS

Other features and advantages of the present invention will become more clearly apparent on reading the following description of several preferred embodiments of the invention, with reference to the corresponding accompanying drawings wherein.

DETAILED DESCRIPTION OF THE PREFERRED EMBODIMENTS

The invention relates to a system for rotationally coupling two telescopic shafts.

Figure 1:
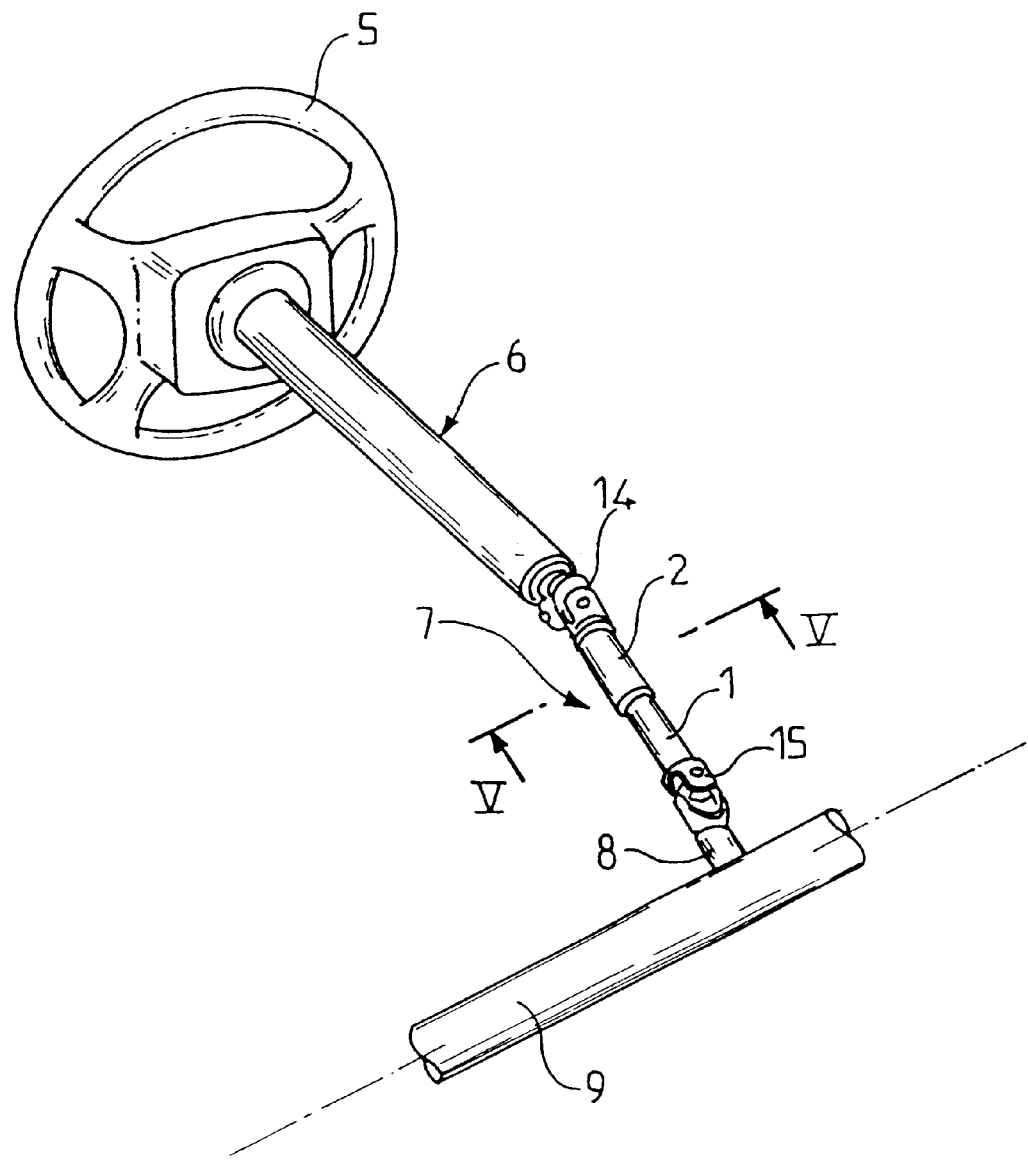
FIG. 1 is a diagrammatic perspective view of an automobile vehicle steering system in which a coupling system according to the invention has been applied to the intermediate column portion.

This coupling system applies particularly well to an automobile vehicle steering system, as shown diagrammatically in FIG. 1.

The steering system represented includes a steering column with a top column part 6, also referred to as the column top, and an intermediate column part 7, also referred to as the intermediate shaft.

The top column part 6 is connected by its top end to a steering wheel 5 and by its bottom end to the intermediate column part 7.

The intermediate column part 7 is connected by its top end to the top column part 6 and by its bottom end to a steering box 8 of a steering bar 9.

The opposite ends of the intermediate column portion 7 are connected by a universal joint 14 to the top column part 6 and by a universal joint 15 to the steering box 8.

Hereinafter, the description refers to a coupling system that is included in the intermediate column part 7. The coupling system according to the invention can also be included in the top column portion 6.

Figure 2:
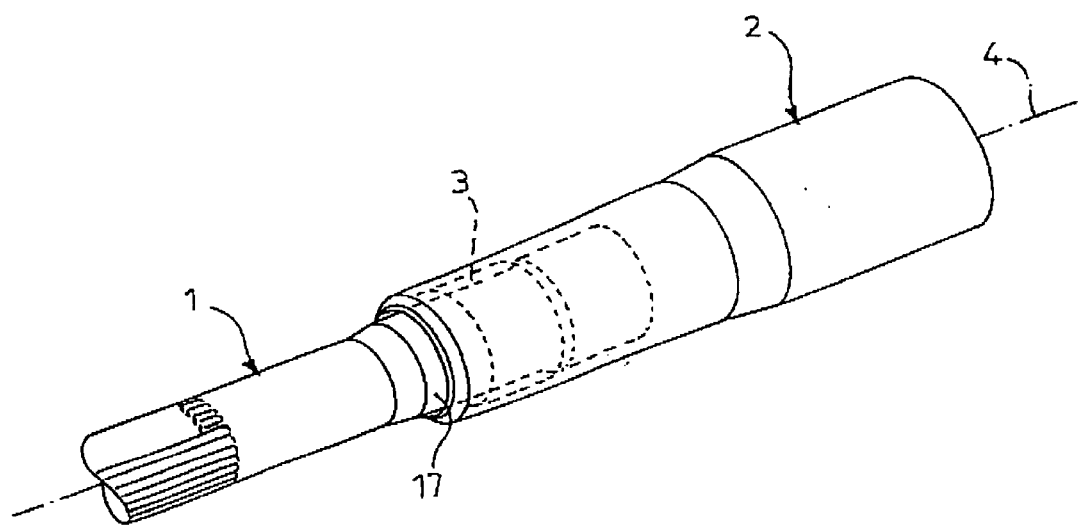
FIG. 2 is a perspective view of the above coupling system according to the invention.
Figure 3:
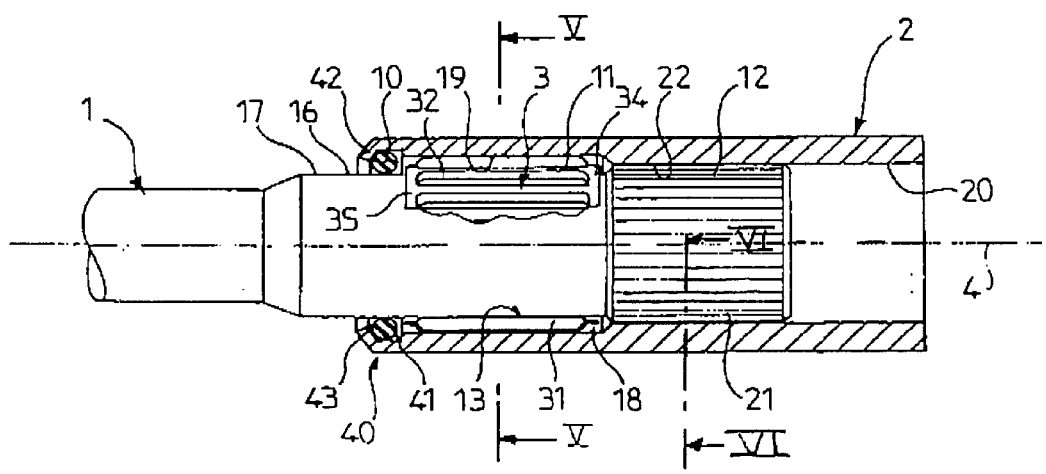
FIG. 3 is a view of the coupling system shown in FIG. 2 in section in a plane passing through the common axis of the two shafts.

FIGS. 2 and 3 show the intermediate column part 7 and the general principle of the system in accordance with the invention for rotationally coupling two telescopic shafts.

An interior shaft 1 and an exterior tubular shaft 2 slide one within the other in the direction of their common axis 4, which is shown in FIGS. 2 and 3.

In the remainder of the description, the term "interior" or "internal" refers to a member which is nearer the common axis 4 and the term "exterior" or "external" refers to a member which is farther away from the common axis 4.

To be more precise, the invention relates to a system for rotationally coupling two shafts able to turn about a common axis 4. One of the two shafts is an interior shaft 1 and the other shaft is an exterior shaft 2, the two shafts 1 and 2 being disposed so that they can slide one within the other along the common axis 4.

The coupling system according to the invention includes:

a first rotational coupling 11 between the two shafts 1 and 2 and which is constituted by a rotation friction system located between the interior shaft 1 and the exterior shaft 2; and a second rotational coupling 12 between the two shafts 1 and 2 and which is constituted by internal splines 21 and external splines 22, the internal splines 21 being located on a periphery of an end of the interior shaft 1 and the external splines 22 being located on an internal face of a tube constituting the exterior shaft 2; the internal splines 21 and the external splines 22 are adapted to cooperate with each other.

The system according to the invention is such that if a normal rotation torque is to be transmitted it is transmitted by friction and if an exceptional rotation torque is to be transmitted it is additionally transmitted by means of the splines, after taking up the clearance space C between the splines.

The first rotational coupling between the interior shaft 1 and the exterior shaft 2 includes a spring or resilient ring 3 which constitutes the rotation friction system, said resilient ring 3 pressing on the one band on an internal face 19 of a housing 18 located in the exterior shaft 2, and on the other hand on a portion 16 of an external face 17 of the interior shaft 1 that is smooth. In another embodiment of the invention, the portion 16 of the external face 17 of the interior shaft 1 that is pressed on by resilient ring 3 may be knurled.

Figure 4:
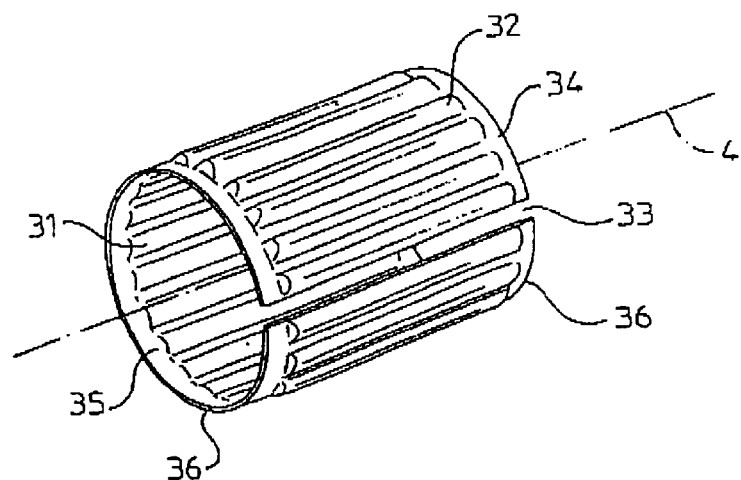
FIG. 4 is a perspective view of the spring ring shown in FIGS. 2 and 3.
Figure 6:
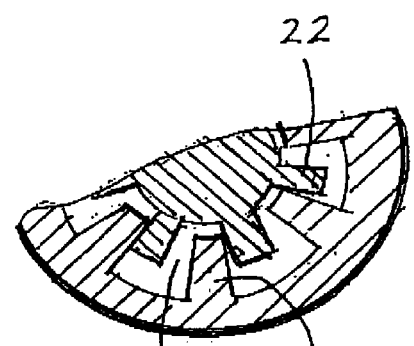
FIG. 6 is a detailed sectional view taken along line VI—VI in FIG. 3.
Figure 5:
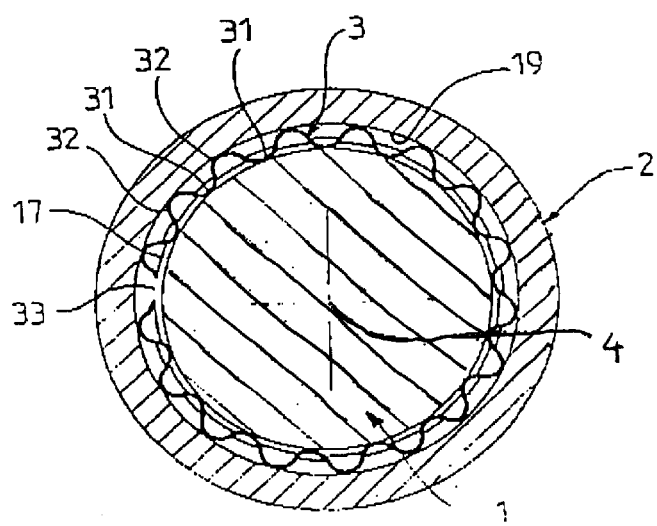
FIG. 5 is a detailed sectional view taken along line V—V in FIG. 3.

As can be seen in FIGS. 3, 4 and 5, the resilient ring 3 is a metal ring which has a slit 33 extending on the whole of its axial length. Said metal ring 3 has a serpentine cross-sectional configuration and includes on its circumference 36 between its end portions 34 and 35 a plurality of circumferentially spaced internal axial recesses 31 and external axial recesses 32. The recesses alternate so that an external axial recess 32 follows on from an internal axial recess 31. The external axial recesses 32 are pressed onto the internal face 19 of the housing 18 in the exterior shaft 2 and the internal axial recesses 31 are pressed onto the smooth portion 16 of the external face 17 of the interior shaft 1.

The coupling system according to the invention further includes an axial coupling 13 between the interior shaft 1 and the exterior shaft 2. This axial coupling 13 between the interior shaft 1 and the exterior shaft 2 is provided by the rotation friction system, which is adapted to resist axial sliding between the interior shaft 1 and the exterior shaft 2 upto a predetermined value.

The coupling system according to the invention further includes a one-way axial abutment system 40, to prevent extraction of the interior shaft 1 in the axial direction. This axial abutment system 40 includes a toroidal ring 10 which is disposed in a housing 41 located at the end 42 of the exterior shaft 2. This toroidal ring 10 is retained in the direction of the common axis by a crimping folding 43 at the end 42 of the exterior shaft 2 on the toroidal ring 10. This toroidal ring 10 is also pressed against the smooth portion 16 of the external face 17 of the interior shaft 1.

What we claim is:

1. A coupling apparatus for coupling a tubular exterior shaft with a linear interior shaft arranged coaxially in concentrically spaced relation therein, comprising:

(a) first coupling means (ii) connecting said shafts by friction, thereby to normally effect simultaneous rotational movement of said shafts; and (b) second coupling means (12) connecting said shafts for axial and limited rotational displacement relative to each other;

(c) said first coupling means including a generally annular longitudinally-slit resilient member (3) formed of metal and arranged concentrically between said exterior and said interior shafts, said resilient member having a generally serpentine cross-sectional configuration defining a plurality of circumferentially spaced alternate internal and external recessed portions in frictional engagement with adjacent surfaces of said exterior and interior shafts, respectively;

(d) said second coupling mews being longitudinally arranged relative to said first coupling means and including a plurality of axially-extending circumferentially-spaced first and second splines (21, 22) on said adjacent surfaces of said exterior and interior shafts, respectively, the thickness of said splines being such as to define clearance spaces between cooperating pairs of first and second splines, respectively, thereby to permit limited relative rotational displacement of said shafts, and with the axial displacement of said shafts being resisted by the frictional effect of said first coupling means.

2. A coupling apparatus as defined in claim 1, wherein at least one of the adjacent surfaces of said exterior and said interior shafts that is engaged by said resilient member is smooth.

3. A coupling apparatus as defined in claim 1, and further including:
   (e) one-way axial abutment means (40) preventing axial displacement of said interior shaft in a given direction from a given position relative to said exterior shaft.

4. A coupling apparatus as defined in claim 3, wherein said axial abutment means includes a toroidal ring contained in a chamber defined in one end (42) of said exterior shaft and which is retained against axial displacement in said given direction by a crimped portion (43) defined at said exterior shaft one end, said toroidal ring being pressed onto a smooth portion of an external face of said interior shaft.

5. A steering system for vehicles, comprising:
   (a) a steering wheel (1);
   (b) a steering box (8);
   (c) articulated steering column means (6, 7) connecting said steering wheel with said steering box, and steering column means including:
      (1) a tubular exterior shaft (2);
      (2) a linear interior shaft (1) arranged coaxially in concentrically spaced relation within said exterior shaft; and
   (3) coupling means for coupling said exterior shaft with said interior shaft, comprising:
      (a) first coupling means (11) connecting said shafts by friction, thereby to normally effect simultaneous rotational movement of said shafts; and
      (b) second coupling means (12) connecting said shafts for axial and limited rotational displacement relative to each other;
      (c) said first coupling means including a generally annular longitudinally-slit resilient member (3) formed of metal and arranged concentrically between said exterior and said interior shafts, said resilient member having a generally serpentine cross-sectional configuration defining a plurality of circumferentially spaced alternate internal and external recessed portions in frictional engagement with adjacent surfaces of said exterior and interior shafts, respectively;
      (d) said second coupling means being longitudinally arranged relative to said first coupling means and including a plurality of axially-extending circumferentially-spaced first and second splines (21,22) on said adjacent surfaces of said exterior and interior shafts, respectively, the thickness of said splines being such as to define clearance spaces between cooperating pairs of first and second splines, respectively, thereby to permit limited relative rotational displacement of said shifts, and with the axial displacement of said shafts being resisted by the frictional effect of said first coupling means.

* * * * *